July 4, 1944.  R. F. EDGAR  2,352,948
ELECTROMAGNETIC DEVICE
Filed April 2, 1943
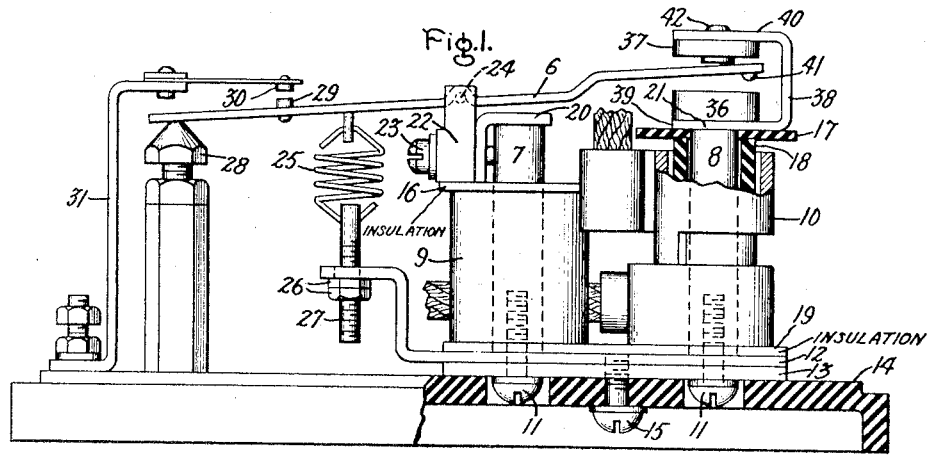
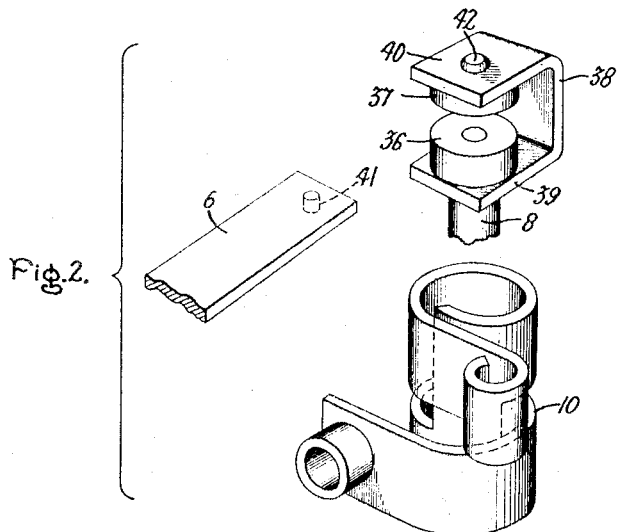
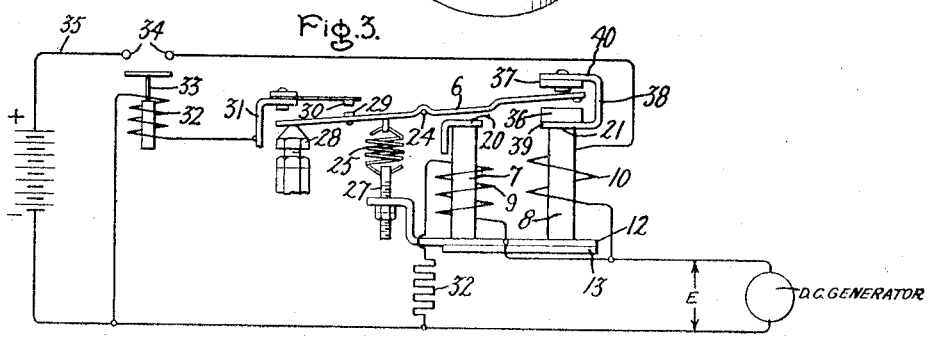
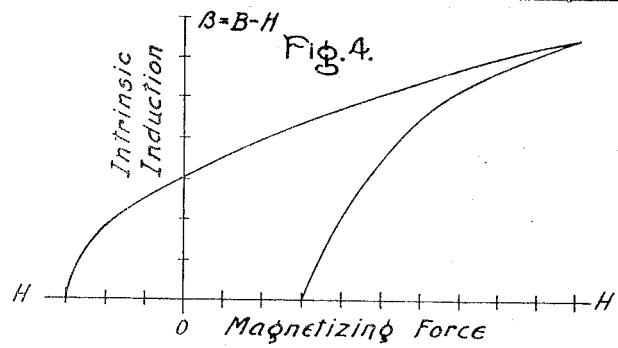
Inventor:
Robert F. Edgar,
by Harry E. Dunham
His Attorney.

Patented July 4, 1944

2,352,948

UNITED STATES PATENT OFFICE 2,352,948

ELECTROMAGNETIC DEVICE

Robert F. Edgar, Pattersonville, N. Y., assignor to General Electric Company, a corporation of New York Application April 2, 1943, Serial No. 481,591

12 Claims. (Cl. 175—339)

My invention relates to improvements in electromagnetic devices and more particularly electromagnetic relays of the so-called reverse current type and especially relays whose operation is dependent on the relative directions and magnitudes of two continuous electric current quantities.

In charging storage batteries from direct current generators, it is customary to use with each generator a relay which is responsive to the voltage of the generator for controlling the connection of the generator to the bus and which is also conjointly responsive to the current flowing between the bus and the generator after the connection therebetween is established to determine whether or not such connection should be maintained. In general, this operation is obtained by a voltage coil which by actuation of an armature to the attracted position effects movement of a suitable circuit controlling member to connect the generator to the bus. A current coil assists the holding effect of the voltage coil as long as current flows from the generator to the bus, but upon a reversal of current opposes the effect of the voltage coil. This so reduces the holding effect on the armature that it moves to the unattracted position under suitable bias. In normal operation, such a relay device functions satisfactorily. However, in case of a fault in the generator, such as loss of field, armature short circuit and the like, the reverse current flow from the battery and other generators builds up so rapidly and to such high values that the armature is maintained in the attracted position by the current coil since this coil quickly establishes sufficient magnetic flux not only to overpower the effect of the voltage coil but also to hold the armature. This failure to disconnect a faulty generator is likely to result in destruction of the generator and increased fire hazard to say nothing about inability of other equipment to perform because of the power drain into faulty equipment.

An object of my invention is to provide for an electromagnetic device whose operation is dependent on the relative directions and magnitudes of two continuous electric current quantities an improved arrangement for preventing false operation of the device when one of the electric quantities reverses. Another object of my invention is to prevent false operation of the device upon reversal of one of the electric quantities by providing a relatively simple and economical means which is readily adaptable to existing reverse current relay structures. These and other objects of my invention will hereinafter appear in more detail.

In accordance with my invention, I provide a supplementary magnetic circuit which is so embodied in the magnetic circuit of a reverse current relay as to prevent the current winding from overpowering the voltage winding and maintaining the armature in the attracted position on the occurrence of a reversal of current in the current winding. Further in accordance with my invention, this supplementary magnetic circuit includes two spaced high coercive force permanent magnets, each of which is magnetized in the direction of its least dimension, and in the gap between which the armature is movable. Also in accordance with my invention, these permanent magnets are interconnected by a low retentivity magnetic member and are so arranged thereon as to present poles of opposite polarity to each other and one to present a pole of opposite polarity and the other a pole of the same polarity to one of the poles of the relay magnetic structure.

My invention will be better understood from the following description when considered in connection with the accompanying sheet of drawings, and its scope will be pointed out in the appended claims.

In the accompanying sheet of drawings, Fig. 1 is a side elevation, partly in section, of an electromagnetic relay device embodying my invention; Fig. 2 is an exploded perspective of a part of the embodiment of my invention shown in Fig. 1; Fig. 3 is a circuit diagram illustrating an application of the relay shown in Fig. 1; and Fig. 4 illustrates a hysteresis loop of a permanent magnet material particularly suitable in carrying out my invention.

For the purpose of setting forth my invention, I have shown in Fig. 1 a reverse current electromagnetic device comprising an armature 6 and an electromagnetic actuating means therefor comprising two magnetic cores 7 and 8, respectively provided with energizing windings or coils 9 and 10. The coil 10 is shown as of the strap wound type because of the large current flow to which it may be subjected. The cores 7 and 8 are secured as by screws 11 to a common magnetic member which, as illustrated, comprises two magnetic strips 12 and 13. This magnetic structure is secured to a base 14 of suitable insulating material by suitable means such as one or more screws 15. The coils 9 and 10 are suitably insulated from the core structure, as indicated by insulating collars 16 and 17, an insulating cylinder 18 and an insulating strip 19. The magnetic structure thus presents two poles 20, 21 to the armature 6, which is pivotally supported in a bracket 22 suitably secured by screws 23, for example, to an angular extension of the pole 20. As shown, the pivotal support comprises a pin 24 which is welded to the armature 6 and journaled in the sides of the bracket 22 which is preferably non-magnetic. Also, the armature is biased for movement to the unattracted position by suitable means such as a spring 25, the tension of which can be varied as desired to change the pickup point by adjustment of jamb nuts 26 on a threaded post 27 mounted in the member 12, as shown. For limiting counterclockwise movement of the armature 6, that is to the unattracted position, there is provided an adjustably positioned back stop 28 which is mounted on the base 14 and by means of which it is possible to change the gap or separation of two cooperating contacts 29 and 30, respectively mounted on the armature and on a post 31 secured to the base 14.

If the operating winding 9 is connected across a D. C. generator through a suitable resistance 32, if required, as indicated in Fig. 3, then when the generator voltage E rises to a predetermined value, the flux produced by the operating winding will move the armature 6 to the attracted position closing the contacts 29 and 30 against the bias of the spring 25. In cases of relatively small currents, contacts 29 and 30 may actually complete a generator charging circuit. However, in case of large currents, the closing of the contacts 29 and 30 may be arranged to complete the circuit of the winding 32 of a suitable control switch or contactor 33 which operates to connect the generator to the battery bus 35 through its contacts 34, as disclosed, for example, in United States Letters Patent 2,332,951, issued October 26, 1943, to the assignee of this invention. Upon the closing of the contacts 34, the control winding 10 becomes energized in accordance with the current supplied to the battery bus by the D. C. generator. The connections and arrangement of the windings 9 and 10 are such that when current flows from the generator to the battery bus 35 through the winding 10, the magnetic flux of this winding cooperates with the flux of the winding 9 to maintain the armature 6 in the attracted position.

However, if for any reason the voltage of the battery bus 35 exceeds the voltage E of the generator, then current will flow from the battery bus through the winding 10 in a reverse direction. Under these conditions, the flux of the winding 10 is opposed to the flux of the winding 9 and should, therefore, effect the movement of the armature 6 to the unattracted position under the bias of the spring 25. However, it has been found, particularly where a plurality of generators are arranged to be operated in parallel to a battery bus, that certain faults in a D. C. generator produce such a high reverse flux so quickly as to maintain the armature in the attracted position. Such a magnetically locked-in position of the armature is dangerous not only to the faulty generator but also to other equipment and also introduces a fire hazard and, what is very important, constitutes such a power drain on the battery bus that equipment intended to be energized therefrom is, in effect, rendered inoperable.

In accordance with my invention, I provide means for preventing the control winding 10 alone from maintaining the armature 6 in the attracted position when this winding is energized by a current flowing in the reverse of normal direction, that is from the battery bus 35 to the generator while the armature is in the attracted position. As shown, this means comprises two permanent magnets 36 and 37 which are so mounted on one of the poles, such as 21, of the magnetic structure that the armature 6 can move in the gap between these permanent magnets. In the illustrated embodiment of my invention, the mounting means is shown as a U-shaped magnetic member 38 having two branches or arms 39 and 40 on which are respectively mounted the permanent magnets 36 and 37. The magnetic member 38 is preferably of low retentivity, soft steel for example, and of such cross sectional area as not to saturate under the flux conditions to which it is subjected. Further in accordance with my invention, the permanent magnets 36 and 37 are of a material or alloy which cannot be demagnetized by the maximum resultant flux of the windings 9 and 10 when current flow in the winding 10 is from the bus 35 to the generator. In other words, these permanent magnets should have a sufficiently high coercive force to serve as an efficient permanent magnet when energized in the direction of their least dimension. Such a permanent magnet material is disclosed as a silver, manganese, aluminum alloy in United States Letters Patent 2,247,804, issued July 1, 1941. This permanent magnet material has a coercive force ($jHc$) of substantially 6000, and its $\beta H$ hysteresis loop is substantially as shown in Fig. 4. In order to prevent the armature 6 from sticking to the lower permanent magnet 36, the armature may be provided with a non-magnetic projection 41. Also to prevent the armature from sticking to the upper permanent magnet 37, the rivet 42, by which this permanent magnet is fastened to the arm 40 of the magnetic member 38, may project beyond the lower pole face of the permanent magnet 37.

For the purpose of explaining the operation of my invention, it will be assumed that the winding 9 tends to make the pole 20 of north polarity and that when current flows from the generator to the bus 35, the winding 10 tends to make the pole 21 of south polarity, which will be termed this pole's normal polarity. Then on the basis of these assumptions, I mount the permanent magnet 36 so that it presents a north pole to the pole 21 and the permanent magnet 37 so that it presents a north pole to the upper or south pole of the permanent magnet 36. The other or upper pole of the permanent magnet 37 is then a south pole, that is the same as the normal polarity of the pole 21. If now the winding 9 is energized and the voltage of the generator is sufficiently high, then flux flow is established from the pole 20 through the armature 6 to the upper or south pole of the permanent magnet 36 to the pole 21 and around through the core 8, the magnetic members 12 and 13 and the core 7. Under these conditions, the armature will be moved to the attracted position, and there will be a repelling action by the lower or north pole of the upper permanent magnet 37. Upon the movement of the armature to the attracted position and the circuit closing operation of the controller 33 if current flows in the normal direction, that is from the generator to the bus, the effect of the winding 10 will be to add to the effect of the winding 9 so that the armature remains closed.

If, for any reason, however, current should flow from the battery bus 35 to the generator, then the winding 10 tends to reverse the normal south polarity of the pole 21 and, if the current is sufficient, will succeed in reversing the polarity of this pole 21 so that the direction of flow of flux in the magnetic circuit of the armature 6 in the cores 8 and 7 tends to reverse; that is to say, the flux now tries to flow out of the pole 21 into the armature. Under these conditions, however, the pole 21 presents to the lower pole of the permanent magnet 36 a pole of the same polarity. In consequence of this action, the flux tending to flow upward in the core 8 is diverted through the magnetic member 38 and into the permanent magnet 37 and then into the armature 6 from the lower or north pole of the upper permanent magnet 37. This diverted flux, therefore, operates on the armature in a direction to effect its release from the attracted position under the bias of the spring 25, and this is exactly what happens as long as the coercive force of the permanent magnet 36 is sufficient to prevent a reversal of its magnetism. In a specific embodiment of my invention, I have found that the permanent magnet 36 is preferably made about twice the thickness of the permanent magnet 37. This ratio of thicknesses is not fixed for all constructions, but, in general, it is preferable to have the permanent magnet adjacent the pole of the magnetic structure in which flux reversal occurs materially thicker than the other permanent magnet in order to have more reluctance and, therefore, better flux diversion to the upper permanent magnet 37. In this way, it is possible to compensate for the greater reluctance of the flux diversion path through the magnetic member 38 by reason of its length.

While I have shown and described my invention in considerable detail, I do not desire to be limited to the exact arrangements shown, but seek to cover in the appended claims all those modifications that fall within the true spirit and scope of my invention.

What I claim as new and desire to secure by Letters Patent of the United States is:

1. An electromagnetic device comprising an armature biased for movement to the unattracted position, a magnetic structure presenting two poles toward said armature, an operating winding for said structure operative upon a predetermined energization to effect movement of the armature to the attracted position, a control winding for said structure operative when energized by current in a predetermined direction relatively to the current in said operating winding to help said operating winding to maintain the armature in the attracted position and when energized by current in a direction reverse to said predetermined direction to oppose the effect of said operating winding whereby to permit movement of the armature to the unattracted position, and flux diverting means for preventing said control winding alone from maintaining said armature in the attracted position when energized by a current in said reverse direction while the armature is in the attracted position comprising a U-shaped magnetic member secured to one of the poles of said magnetic structure so that the armature can move between the arms of said magnetic member, a permanent magnet mounted on one of the arms of said member for engagement by said armature upon movement thereof to the attracted position, the polarity of the face of said permanent magnet adjacent said one pole being opposite to the normal polarity thereof.

2. An electromagnetic device comprising an armature biased for movement to the unattracted position, a magnetic structure presenting two poles toward said armature, an operating winding for said structure operative upon a predetermined energization to effect movement of the armature to the attracted position, a control winding for said structure operative when energized by current in a predetermined direction relatively to the current in said operating winding to help said operating winding to maintain the armature in the attracted position and when energized by current in a direction reverse to said predetermined direction to oppose the effect of said operating winding whereby to permit movement of the armature to the unattracted position, and means for diverting the magnetic flux tending to flow between said one pole and said armature when the armature is in the attracted position adjacent one pole and the control winding is energized by a current in said reverse direction comprising a magnetic member secured to said one pole and having a portion projecting over the side of the armature away from said one pole, and a permanent magnet mounted on the side of said magnetic member opposite said one pole for engagement by said armature on movement thereof to the attracted position, the polarity of the face of said permanent magnet adjacent said one pole being opposite to the normal polarity thereof.

3. An electromagnetic device comprising an armature biased for movement to the unattracted position, a magnetic structure presenting two poles toward said armature, an operating winding for said structure operative upon a predetermined energization to effect movement of the armature to the attracted position, a control winding for said structure operative when energized by current in a predetermined direction relatively to the current in said operating winding to help said operating winding to maintain the armature in the attracted position and when energized by current in a direction reverse to said predetermined direction to oppose the effect of said operating winding whereby to permit movement of the armature to the unattracted position, and flux controlling means for preventing said control winding alone from maintaining said armature in the attracted position when energized by a current in said reverse direction while the armature is in the attracted position comprising two permanent magnets and means mounting said permanent magnets on one of said poles for movement of the armature between the permanent magnets, said mounting means comprising a low retentivity magnetic member on which said permanent magnets are mounted to present unlike polarities to each other and one permanent magnet to present to said one pole a polarity opposite to the normal polarity of such pole.

4. An electromagnetic device comprising an armature biased for movement to the unattracted position, a magnetic structure presenting two poles toward said armature, an operating winding for said structure operative upon a predetermined energization to effect movement of the armature to the attracted position, a control winding for said structure operative when energized by current in a predetermined direction relatively to the current in said operating winding to help said operating winding to maintain the armature in the attracted position and when energized by current in a direction reverse to said predetermined direction to oppose the effect of said operating winding whereby to permit movement of the armature to the unattracted position, and flux controlling means for preventing said control winding alone from maintaining said armature in the attracted position when energized by a current in said reverse direction while the armature is in the attracted position comprising two high coercive force permanent magnets each magnetized in the direction of its least dimension, means mounting said permanent magnets on one of said poles for movement of the armature between the permanent magnets, said mounting means comprising a low retentivity magnetic member on which said permanent magnets are mounted to present unlike polarities to each other and one permanent magnet to present to said one pole a polarity opposite to the normal polarity of such pole.

5. An electromagnetic device comprising an armature biased for movement to the unattracted position, a magnetic structure presenting two poles toward said armature, an operating winding for said structure operative upon a predetermined energization to effect movement of the armature to the attracted position, a control winding for said structure operative when energized by current in a predetermined direction relatively to the current in said operating winding to help said operating winding to maintain the armature in the attracted position and when energized by a current in a direction reverse to said predetermined direction to oppose the effect of said operating winding whereby to permit movement of the armature to the unattracted position, and flux controlling means for preventing said control winding alone from maintaining said armature in the attracted position when energized by a current in said reverse direction while the armature is in the attracted position comprising two high coercive force permanent magnets each magnetized in the direction of its least dimension, means mounting said permanent magnets on one of said poles for movement of the armature between the permanent magnets, said mounting means comprising a low retentivity magnetic member on which said permanent magnets are mounted to present unlike polarities to each other and one permanent magnet to present to said one pole a polarity opposite to the normal polarity of such pole, said one permanent magnet being materially longer than the other in the direction of their magnetizations.

6. An electromagnetic device comprising an armature biased for movement to the unattracted position, a magnetic structure presenting two poles toward said armature, an operating winding for said structure operative upon a predetermined energization to effect movement of the armature to the attracted position, a control winding for said structure operative when energized by current in a predetermined direction relatively to the current in said operating winding to help said operating winding to maintain the armature in the attracted position and when energized by current in a direction reverse to said predetermined direction to oppose the effect of said operating winding whereby to permit movement of the armature to the unattracted position, and flux controlling means for preventing said control winding alone from maintaining said armature in the attracted position when energized by a current in said reverse direction while the armature is in the attracted position comprising a low retentivity magnetic member having two spaced arms, two high coercive force permanent magnets each magnetized in the direction of its least dimension and respectively mounted on the opposing faces of said arms with their least dimensions extending transversely of the arms and with an air gap between adjacent pole faces, said magnetic member being so mounted on one of said poles that the armature can move in the air gap between the permanent magnets and the normal polarity of said one pole and the polarity of the adjacent pole of one of the permanent magnets being opposite and the polarities of the adjacent faces of said permanent magnets forming said air gap also being opposite.

7. An electromagnetic device comprising an armature biased for movement to the unattracted position, a magnetic structure presenting two poles toward said armature, an operating winding for said structure operative upon a predetermined energization to effect movement of the armature to the attracted position, a control winding for said structure operative when energized by current in a predetermined direction relatively to the current in said operating winding to help said operating winding to maintain the armature in the attracted position and when energized by current in a direction reverse to said predetermined direction to oppose the effect of said operating winding whereby to permit movement of the armature to the unattracted position, and flux controlling means for preventing said control winding alone from maintaining said armature in the attracted position when energized by a current in said reverse direction while the armature is in the attracted position comprising a U-shaped low retentivity magnetic member, two high coercive force permanent magnets each magnetized in the direction of its least dimension and respectively mounted on the inner faces of the arms of said magnetic member and with an air gap between adjacent pole faces, said magnetic member being so mounted on one of said poles that the armature can move in the air gap between the permanent magnets and the normal polarity of said one pole and the polarity of the adjacent pole of one of the permanent magnets being opposite and the polarities of the adjacent faces of said permanent magnets forming said air gap also being opposite.

8. An electromagnetic device comprising an armature biased for movement to the unattracted position, a magnetic structure presenting two poles toward said armature, an operating winding for said structure operative upon a predetermined energization to effect movement of the armature to the attracted position, a control winding for said structure operative when energized by current in a predetermined direction relatively to the current in said operating winding to help said operating winding to maintain the armature in the attracted position and when energized by current in a direction reverse to said predetermined direction to oppose the effect of said operating winding whereby to permit movement of the armature to the unattracted position, and flux controlling means for preventing said control winding alone from maintaining said armature in the attracted position when energized by a current in said reverse direction while the armature is in the attracted position comprising a magnetic member having two spaced arms, two permanent magnets respectively mounted on the opposing faces of said arms with an air gap between adjacent pole faces, said magnetic member being so mounted on one of said poles of said magnetic structure that the armature can move in the air gap between the permanent magnets and the normal polarity of said one pole and the polarity of the adjacent pole of one of the permanent magnets being opposite and the polarities of the adjacent faces of said permanent magnets forming said air gap also being opposite.

9. An electromagnetic device comprising an armature, a magnetic structure presenting a pole toward said armature, means comprising a winding for energizing said structure with a flux whose direction of flow is dependent on the direction of current in said winding, and flux diverting means for preventing said winding from maintaining said armature in the attracted position when energized by a current flowing in a predetermined direction while the armature is in the attracted position comprising a U-shaped low retentivity magnetic member, two high coercive force permanent magnets respectively mounted on the inner faces of the arms of said magnetic member with an air gap between adjacent pole faces and with adjacent pole faces of opposite polarity, said magnetic member being so mounted on said pole that the armature can move in the air gap between the permanent magnets and the polarity of the face of said permanent magnet adjacent said one pole being opposite to the polarity which said winding tends to establish for said pole when the direction of current flow in said winding is the reverse of said predetermined direction.

10. An electromagnetic device comprising an armature, a magnetic structure presenting a pole toward said armature, means comprising a winding for energizing said structure with a flux whose direction of flow is dependent upon the direction of current in said winding, and means for diverting the magnetic flux tending to flow between said pole and said armature when the armature is in the attracted position adjacent said pole to prevent said winding from maintaining said armature in the attracted position adjacent said pole upon a predetermined direction of current flow in said winding comprising a magnetic member secured to said pole and having a portion projecting over the side of the armature away from the pole and a permanent magnet mounted on the side of said magnetic member opposite said pole for engagement by said armature on movement thereof to the attracted position, the polarity of the face of said permanent magnet adjacent said one pole being opposite to the polarity which said winding tends to establish for said pole when the direction of current flow in said winding is the reverse of said predetermined direction.

11. An electromagnetic device comprising a low retentivity magnetic member having two arms, two permanent magnets respectively mounted on the inner faces of the arms of said magnetic member with an air gap between adjacent pole faces and with adjacent pole faces of opposite polarity, an armature mounted for movement in the air gap between said permanent magnets, and means for controlling the movement of said armature including said permanent magnets and a magnetic circuit comprising said armature and said magnetic member, and means for magnetizing said magnetic circuit.

12. An electromagnetic device comprising a generally U-shaped low retentivity magnetic member, two high coercive force permanent magnets each magnetized in the direction of its least dimension respectively mounted on the inner faces of the arms of said magnetic member with an air gap between adjacent pole faces and with adjacent pole faces of opposite polarity, an armature mounted for movement in the air gap between said permanent magnets, and means for controlling the movement of said armature including said permanent magnets and a magnetic circuit comprising said armature and said magnetic member, and means for magnetizing said magnetic circuit.

ROBERT F. EDGAR.